Aug. 8, 1950     C. JASPER ET AL     2,518,330
DUCT RODDING MACHINE
Filed Nov. 20, 1947     3 Sheets-Sheet 1
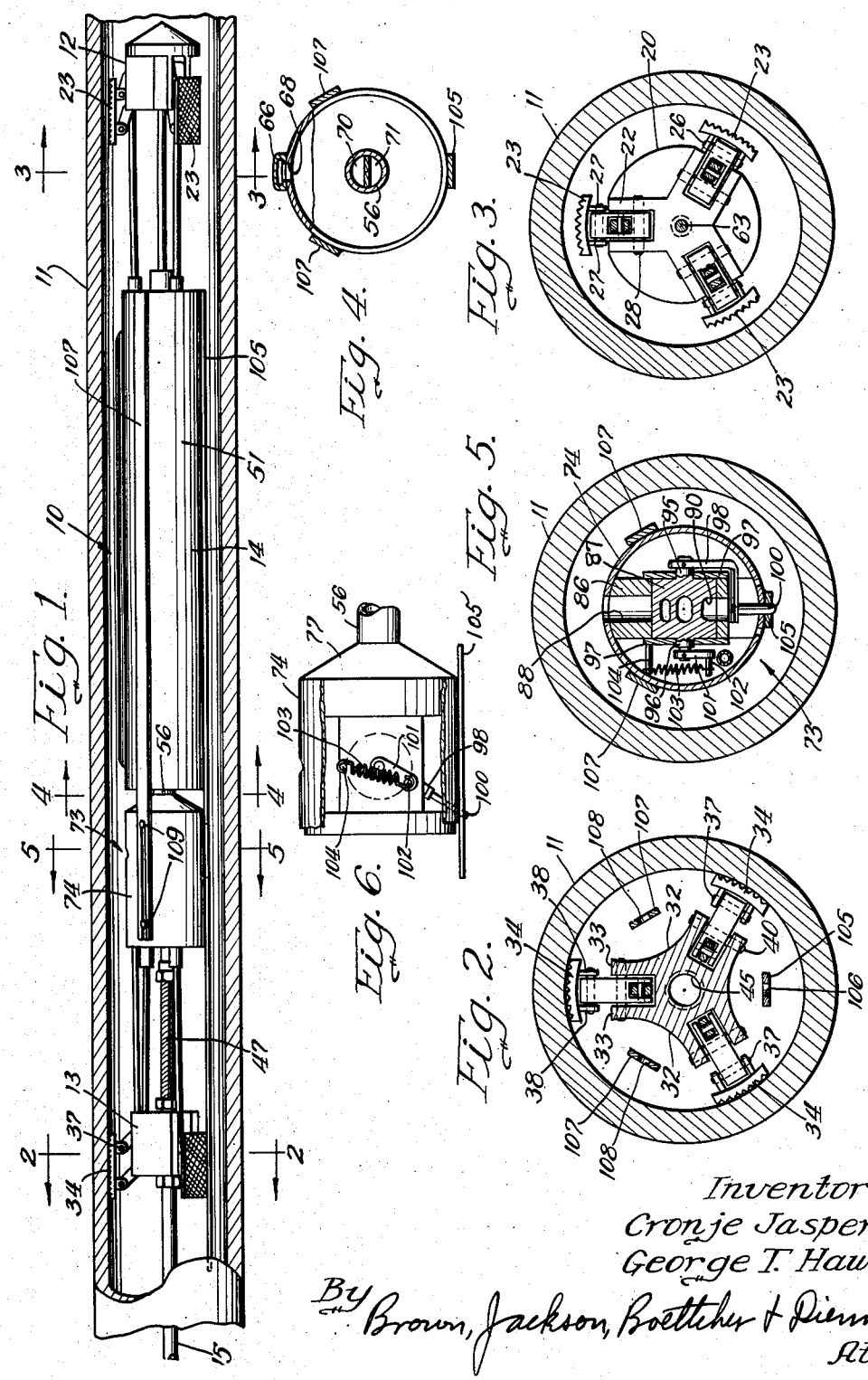
Inventors:
Cronje Jasper
George T. Hawk
By Brown, Jackson, Boettcher & Dienner
Attys.

Aug. 8, 1950         C. JASPER ET AL         2,518,330
                     DUCT RODDING MACHINE
Filed Nov. 20, 1947                        3 Sheets-Sheet 2

Inventors:
Cronje Jasper
George T. Hawk
By Brown, Jackson, Boettcher & Dienner Attys.

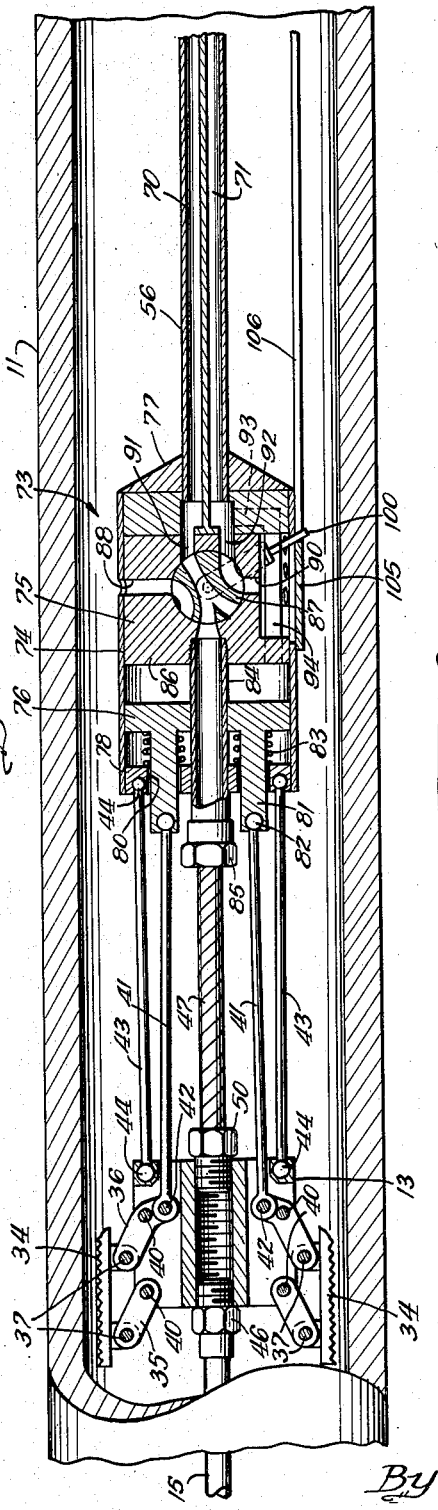

Patented Aug. 8, 1950

2,518,330

UNITED STATES PATENT OFFICE 2,518,330

DUCT RODDING MACHINE

Cronje Jasper, Villa Park, and George T. Hawk, Chicago, Ill.

Application November 20, 1947, Serial No. 787,252

12 Claims. (Cl. 175—377)

This invention relates, generally, to a self-contained motor driven, duct rodding machine. The invention has particular relation to such a machine wherein the motor unit is preferably of the pneumatic type, and wherein there are front and rear duct gripping units one of which is distended in duct gripping relationship while the other is being advanced through a conduit or duct and thereafter the second duct gripping unit is distended into duct gripping relationship while the first duct gripping unit is being advanced.

Although we are aware that various types of self-contained, motor driven, duct rodding mechanisms have been previously suggested, no such mechanism has come to our attention which has been capable of practical and satisfactory operation for duct rodding purposes.

The object of our invention, generally stated, is the provision of a self-contained, motor driven, duct rodding machine capable of rapidly rodding the long lengths of ducts in common use today and more particularly, the long underground conduits utilized for housing electrical cables and conductors.

An important object of the invention is the provision of a self-contained, motor driven, duct rodding machine capable of rapidly advancing through long ducts by means of a positive gripping action of the duct or conduit without injury thereto, and in such a manner as to resist without slippage the large backward pull required when the machine reaches the remote ends of long ducts.

An important object of the invention is the provision of a self-contained, motor driven, duct rodding mechanism having front and rear duct gripping units which are articulated with respect to the intermediate motor unit thereby allowing the mechanism to negotiate curves or bends in a duct and pass over small offsets, or the collections of foreign material which often accumulate in underground conduits.

Still another important object of the invention is the provision of a self-contained, motor-driven, duct rodding machine having a pneumatic type of motor unit interposed between front and rear contractable duct gripping units and operable to distend first one of the duct gripping units into duct gripping relationship while the other in its contracted condition is advanced through the duct, and thereafter to positively distend the latter duct gripping unit while the former, in its contracted condition, is advanced through the conduit.

Certain other objects of the invention will, in part, be obvious and will in part appear hereinafter.

For a more complete understanding of the nature and scope of the invention, reference may be had to the following detailed description thereof taken in connection with the accompanying drawings wherein:

Figure 1 is a side elevational view of a duct rodding machine constituting a preferred embodiment of the invention and shown located in a duct or conduit in one of its operative conditions;

Figure 2 is a sectional view taken on line 2—2 of Figure 1;

Figure 3 is a sectional view taken on line 3—3 of Figure 1;

Figure 4 is a sectional view, partly broken away, taken on line 4—4 of Figure 1;

Figure 5 is a sectional view taken on line 5—5 of Figure 1;

Figure 6 is a fragmentary, side elevational view, partly broken away, taken adjacent line 5—5 of Figure 1;

Figure 7A:
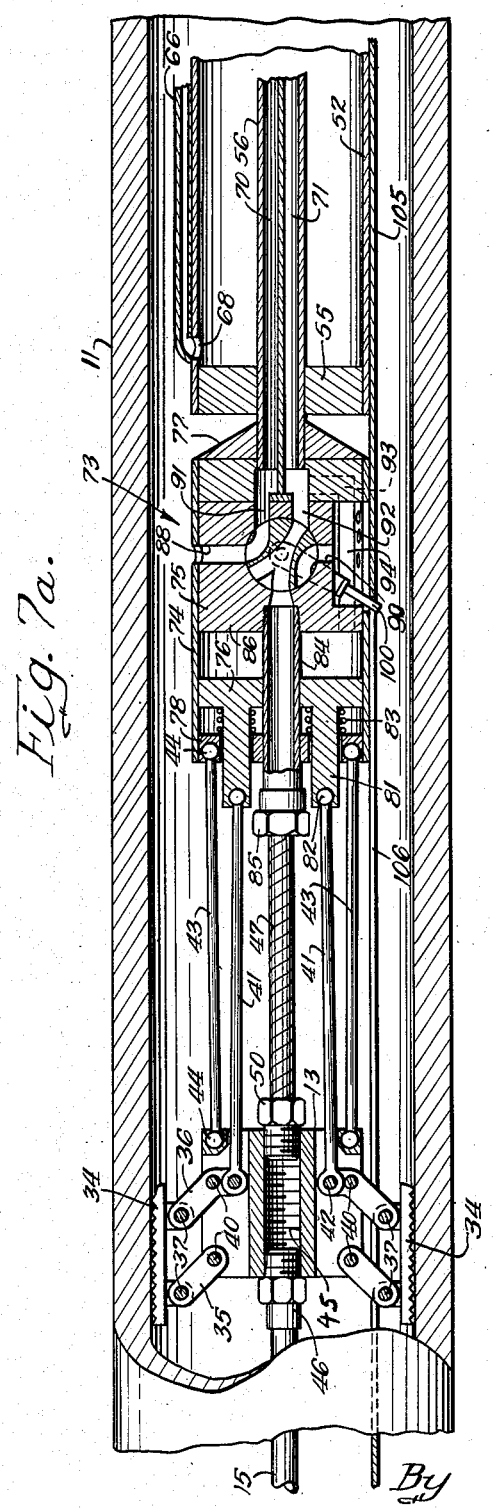
Figure 7B:
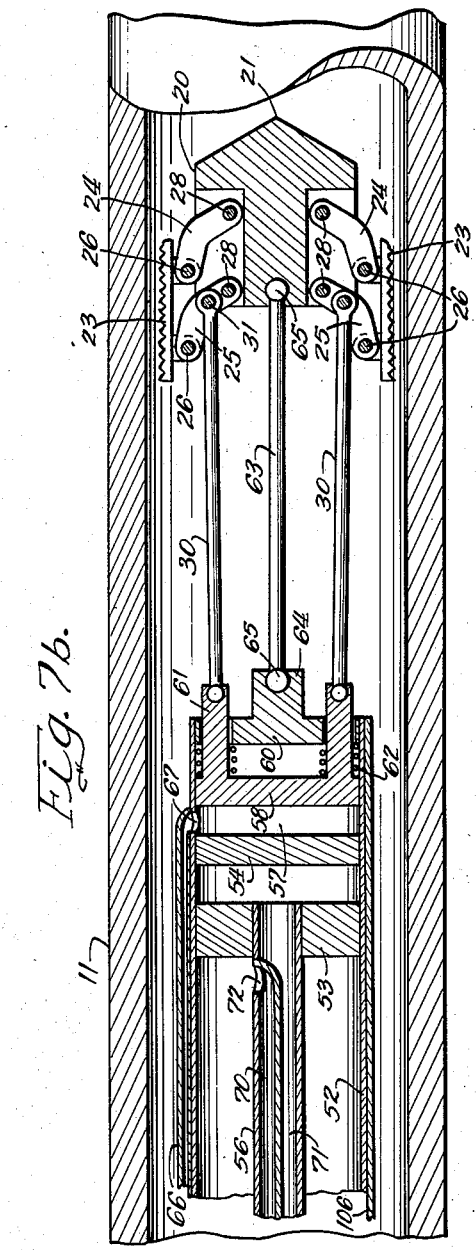

Figures 7a and 7b together constitute a longitudinal sectional view taken through Figure 1; and Figures 8a and 8b are longitudinal sectional views corresponding to Figures 7a and 7b but showing the rodding machine of Figure 1 in its alternate condition of operation.

Referring now particularly to Figure 1 of the drawings, a self-contained, pneumatic motor operated duct rodding mechanism is indicated generally at 10 in one of its alternate stages of operation in a duct or conduit 11. The duct 11 is illustrative of underground conduits and ducts commonly utilized as a housing for cables or conductors.

The duct rodding mechanism 10 comprises a front duct gripping unit 12, a rear duct gripping unit 13 and an intermediate pneumatic motor unit 14. As will appear in greater detail hereinafter, the duct gripping units 12 and 13 are connected in articulated relationship with respect to the motor unit 14, thereby allowing the longitudinal axes of the duct gripping units 12 and 13 to shift independently of each other and of the longitudinal axis of the motor unit 14. This arrangement allows the duct rodding mechanism 10 to negotiate or pass around bends and to pass over obstacles in a conduit such as small offsets therein and deposits of foreign materials such as sand and mud, which may collect when the conduit is disposed underground.

The duct rodding mechanism 10 is supplied with compressed air from a hose 15 connected with the rear portion of the pneumatic motor 14. Although compressed air is the preferred and usual source of fluid pressure utilized in operating our duct rodding mechanism, it will be understood that other compressed gases, such as nitrogen and carbon dioxide, or fluids under pressure such as water or oil, may be utilized when required.

In brief, the overall operation of the duct rodding mechanism 10 is as follows:

The compressed air is admitted to the motor unit 14 through the hose 15 and, depending upon the condition of the control valve of the motor unit, one of the duct gripping units, 12 or 13 is caused to be distended into duct gripping relationship. As shown in Figure 1, the rear duct gripping unit 13 is so distended while the front duct gripping unit 12 is shown as contracted. In this condition of operation, the motor unit 14 forces the front duct gripping unit 12 forward a distance equal to the length of the stroke of the motor unit 14, whereupon, the condition of the control valve is reversed so as to distend the front duct gripping unit 12 into duct gripping relationship while permitting the rear duct gripping unit 13 to be contracted and advanced in the conduit 11 a distance which is also equal to the length of the stroke of the motor unit 14. This cycle of operation is rapidly repeated causing the duct rodding mechanism 10 to advance through the duct 11 in a crawling type of forward movement.

The front and rear gripping units 12 and 13, respectively, are of similar construction but differ somewhat with respect to design details because of their difference in location on the duct rodding mechanism 10. Referring to Figures 1, 3, 7b and 8b, it will be noted that the front duct gripping unit 12 has a central hub member 20 having a pointed nose 21 and three pairs of parallel ribs 22 (Figure 3) projecting integrally and radially therefrom, with each pair of ribs being equi-spaced from the other two pairs by angles of 120°.

Each of the pairs of parallel ribs 22 carries a retractable duct gripping shoe 23 of rectangular projection and arcuate cross-section for gripping a relatively large surface area of the interior of a conduit or duct. The duct engaging surfaces of the shoes 23 are preferably cross scored in the manner shown in order to provide a large number of points for greater gripping engagement with the interior of the conduit.

Each shoe 23 is retractably supported in one of the pairs of ribs 22 by a pair of links 24 and 25. Each of the links 24 and 25 is pivotally connected at its outer end to the front and rear portions, respectively, of the shoes 23. The connections are made by means of pins 26 extending through the aligned holes in pairs of integral lugs 27 provided on the inner surface of each of the shoes 23 and holes provided in the outer end of each of the links 24 and 26.

In the front duct gripping unit 12, the inner ends of the links 24 and 25 are pivoted to the front and rear portions, respectively, of the hub member 20 by means of pins 28, as shown.

It will be seen that the foregoing supporting arrangement for the three shoes 23 permits them to be either contracted as shown in Figures 3 and 7b, or distended into duct gripping relationship as shown in Figure 8b. In order to effect the distension and contraction of the shoes 23 each of the links 25 is by means of a pin 31 pivotally connected intermediate its ends with a connecting rod 30 extending from the motor unit 14. Thus, each of the links 25 constitutes a third class type of lever fulcrumed about a pin 28.

For a detailed description of the design and construction of the rear conduit gripping unit 13 reference may be had to Figures 1, 2, 7a and 8a. The duct gripping unit 13 has a central hub member 32 having three pairs of parallel ribs 33 extending integrally and radially therefrom and spaced 120° apart with respect to each other as shown in Figure 2. Each of the pairs of parallel ribs 33 carries a duct gripping shoe 34 which may correspond to the duct gripping shoes 23 of the front duct gripping unit 12. Likewise, each of the shoes 34 is supported from the central hub 32 by means of a pair of links 35 and 36. Each of the links 35 and 36 is pivotally connected to the inner side of the respective shoes 34 by means of a pin 37 extending through the outer ends of the links 35 and 36 and the pairs of integral lugs 38 provided on the inner sides of the shoes 34.

Each of the links 35 and 36 is pivotally connected to the respective pairs of parallel ribs 33 adjacent the outer edges thereof by means of pins 40 extending through opposite sides of the ribs 33 and the links 35 and 36 disposed therebetween. Each of the links 36 is in the form of a bell crank lever having an arm portion extending beyond its respective pin 40 with the end of this arm portion pivotally connected by means of a pin 42 to one of three connecting rods 41 extending from the motor unit 14. It will be seen that the links 36 serve as bell crank levers for distending and retracting the duct gripping shoes 34, with these links being actuated by the connecting rods 41.

The central rub member 13 is supported from the motor unit 14 by means of three equi-spaced tie rods 43 extending from the motor unit 14. The outer ends of these tie rods 43 connect with the central hub 13 by means of ball and socket joints as shown, with balls 44 being provided on the ends of the tie rods 43, and the sockets being formed in the central hub 13, as shown.

The central hub 13 is provided with a co-axial hole 45 through the center thereof which serves as a conduit for transmitting air pressure from the air hose 15 connected to the rear portion of the hub 32 by means of an adapter 46 to a flexible hose section 47 interconnecting the central hub 13 with the motor unit 14. An adapter 50 connects the hose length 47 with the front side of hub member 13.

The motor unit 14 has a master cylinder unit indicated generally at 51 (Figure 8b) which includes a pressure cylinder 52 and a double-acting piston 53 disposed therein. The front wall of the cylinder 52 is formed by a plug 54, while the rear wall is formed by a plug 55, the latter having a central opening therein for accommodating a piston rod 56 which is connected at one end to the double-acting piston 53 and which projects from the cylinder 52 at its opposite end.

It will be noted that the front plug 54 is inwardly set from the front end of the cylinder 52 thereby providing a short cylinder 57 in which is disposed an auxiliary piston 58. The cylinder 57 provided by the end extension of the cylinder 52 and the piston 58 together form a combination piston and cylinder unit which serves to operate the front duct gripping unit 12.

The outer end of the cylinder 57 is closed by an end plug 60 having three equally spaced openings provided therein for receiving the three equi-spaced projections 61 which extend from the piston 58. A compression spring 62 surrounds each of the projections 61 in back of the end plug 60, and these springs 62 normally bias the piston 58 to a rearward or retracted position so that the piston 58 acting through the connecting rods 30 normally holds the shoes 23 of the front duct gripping unit 12 in their contracted position, as shown in Figure 7b.

A tie rod 63 extends from a center boss 64 of the plug 60 to the center of the central hub member 20 of the duct gripping unit 12. The ends of the tie rod 63 are provided with balls 65 which fit into sockets provided therefor in the piston hub 60 and hub member 20, as shown.

This ball and socket type of connection permits the front duct gripping unit 12 to shift independently of the motor unit 14 and yet to be rigidly connected therewith insofar as front-rear movement is concerned. The tie rods 43 and 63 act as radius rods permitting limited free lateral movement of the heads in any direction relative to the main motor, but maintaining the jaw carrying heads 13 and 20 at predetermined distances from the corresponding main motor parts to which they are connected.

In order that pressure may be simultaneously applied to and released from the rear of the double-acting piston 53 and the rear of the auxiliary piston 58, an outside conduit 66 is provided (Figure 8b) which interconnects an opening 67 in the rear of the cylinder 57 with an opening 68 in the pressure cylinder 52 adjacent the rear wall 55 thereof.

The piston rod 56 is hollow and partitioned into an upper passageway 70 and the lower passageway 71. As shown in Figure 8b, the upper passageway 70 terminates at an opening 72 adjacent the rear side of the double-acting piston 53, while the lower passageway 71 extends through to the opposite side or front of the double-acting piston 53.

Referring now particularly to Figures 7a and 8a, it will be seen that a combination control valve unit and auxiliary piston unit are mounted on the rear end of the piston rod 56, as indicated generally at 73. A cylindrical sleeve 74 serves as a housing for the control valve unit 75 and as a cylinder wall for the auxiliary piston 76 located in the rear portion thereof. A front plug 77 serves to connect the combined unit 73 with the piston rod 56. The rear end of the cylinder 74 is closed by a plug 78 from the circumference of which the three tie rods 43 project and connect with the rear duct gripping unit 13. Each of the tie rods 43 is provided with a ball 44 on the front end thereof which fits in a socket provided for in the plug 78.

The plug 78 is also provided with three equi-spaced openings 80, through which three equi-spaced extensions 81 of the piston 76 extend. The connecting rods 41 are each provided with a ball 82 on the front end thereof which fits in a socket provided therefor on the rear end of each extension 81, as shown. In order normally to bias the auxiliary piston 76 towards its forward position adjacent the control valve unit 75, compression springs 83 are provided on each of the projections 81 in between the plug 78 and the piston 76.

Both the plug 78 and the piston 76 are provided with central openings for accommodating a tubular section 84 which transmits compressed air from the flexible connection 47 into the two-way control valve unit 75. The section 74 is connected with the flexible connection 47 by means of an adapter 85.

Referring to Figures 5, 6, 7a and 8a, it will be seen that two-way control valve units 75 comprises a block 86 provided with a central opening in which is disposed a rotatable cylindrical valve member 87. The block 86 has an upper exhaust port 88 and a lower exhaust port 90. The block 86 is provided at its front end with a port 91 which communicates with the upper passageway 70 in the piston rod 56, and a lower port 92 which communicates with the lower passageway 71 in the piston rod 56. The port 92 also communicates with a passageway 93 (Figure 8a) having a short vertical arm and a longer horizontal arm which is designated at 94 and which opens into the cylindrical space in front of the auxiliary piston 76.

Referring particularly to Figures 5 and 6, it will be seen that central hubs 95 and 96 project from opposite sides of the cylindrical valve member 87 and extend through openings provided therefor in the side members 97 which are secured to the valve block 86 so as to retain the valve member 87 in place therein. An L-shaped arm 98 has the end of its vertical leg fitted over and pinned to the projecting hub 95 while its horizontal leg extends under the valve block 86 and carries a downwardly projecting pin 100 which extends through a longitudinal slot formed in the bottom of the cylinder 74.

In order to impart a snap action to the valve member 87 in moving from one control position to the other, an over-center device is provided on that side of the valve block 86 from which the hub 96 projects. The over-center arrangement is in the form of a crank 101 pinned to the hub 96 and carrying a pin 102 on the outer end thereof. A tension spring 103 is fastened over the pin 102 at one end and the other end of the spring 103 is fastened to a stationary pin 104 projecting from the side member 97. It will be apparent from Figure 6 that when the pin 100 is moved either to the left or right of the true vertical position, the spring 103 acts to snap the pin and the cylindrical valve member 87 connected therewith to their alternate positions.

The pin 100, and thereby the control valve 75, is actuated by the flat guide strip 105 extending along the bottom of the master cylinder 51 and projecting rearwardly therefrom. This guide strip 105 is provided with a long slot 106 in the projecting portion thereof through which slot the pin 100 extends. The pin 100 is moved from one position to the other by engagement alternately with the front and rear end of the slot 106.

The relative movement between the master cylinder unit 51 of the pneumatic motor 14 and the combination unit 73 supported on the free end of the piston rod 56 is guided by means of the two equi-spaced guide strips 107 (Figure 1) in combination with strip 105. These guide strips 107 may correspond to guide strip 105 and are equi-spaced therefrom an angular distance of 120°, as shown in Figure 2. Each one of the guide strips 107 is also provided with a longitudinal slot 108 in the projecting portion thereof and these slots engage rivets 109 (Figure 1) provided on the cylinder 74 enclosing the combination unit 73. The detailed operation of the rodding mechanism 10 is as follows:

Referring to Figure 8a and 8b of the drawings, the two-way control valve 75 is shown in one of its two alternate position. In the position shown in Figure 8a, the pin 100 is shown in engagement with the rear end of the slot 106 in the guide strip 105 so that the pin 100 is moved to its forward position thereby bringing the valve member 87 into position to connect the port 91 with the air inlet connection 84 while connecting the port 92 with the exhaust port 90. In this condition of the valve member 87, air pressure is transmitted through the upper passageway 70 in the piston rod 56 and is applied to the rear of the double-acting piston 53 and through the passageway 66 is simultaneously applied to the rear of the auxiliary piston 58.

The pressure spaces in front of the double-acting piston 53 and in front of the auxiliary piston 76 are exhausted through the port 92 and exhaust port 90.

The air pressure applied to the auxiliary piston 58 forces it forward against the force of the springs 62, and causes the shoes 23 of the front duct gripping unit 12 to be distended into duct gripping relationship, as shown in Figure 8b, thereby preventing the cylinder 52 from moving. At the same time, the pressure applied to the rear of the double-acting piston 53 causes this to move forward in the cylinder 52 thereby advancing the rear duct gripping unit 13 (which is now in its contracted condition) carrying forward with it the air hose 15. The forward movement of the double-acting piston 53 continues until the pin 100 is engaged by the front end of the slot 106 as shown in Figure 7a, whereupon, the over-center device causes the pin 100 to snap to its rearward position thereby changing the position of the cylindrical valve member 87 to that shown in Figure 7a.

When the valve member 87 is in its position shown in Figure 7a, the port 91 is interconnected with the exhaust port 88 thereby relieving the pressure applied to the rear of the double-acting cylinder 53 and to the rear of the auxiliary piston 58. Thereupon the compression springs 62 cause the auxiliary piston 58 to move to the rear thereby contracting the duct gripping unit 12. At the same time, the port 92 is interconnected with the air inlet connection 84 whereby compressed air is transmitted through the lower passageway 71 in the piston rod 56 and is applied to the front side of the double-acting piston 53 which is now in the position shown in Figure 7b. Also compressed air from the port 92 is communicated to the passageway 93—94 into the pressure space in front of the auxiliary piston 76 thereby causing it to be forced to the rear. Rearward action on the piston 76 serves to distend the conduit gripping shoes 34 of the rear duct gripping unit 13 as shown in Figure 7a. Since the double-acting piston 53 is held stationary by the rear of conduit gripping unit 13, the air pressure applied in front of the double-acting piston 53 causes the cylinder 52 to be advanced thereby carrying forward with it the front conduit gripping unit 12 which is in its contracted position.

The cycle of operation described above in connection with Figures 8a and 8b and Figures 7a and 7b is repeated as long as the duct rodding mechanism 10 is in operation, thereby causing the front and rear duct gripping units 12 and 13, respectively, to alternately advance through the duct 11 so as to rapidly advance the duct rodding mechanism through.

It will be noted that when a rearward pull or force is applied to either of the duct gripping units 12 or 13 in their distended condition, such a pull or force tends to cause the duct engaging shoes more firmly to engage with the conduit with an increased gripping force which is directly proportional to the increase in pull or backward force. It will also be seen that the front and rear duct gripping units 12 and 13 are free to shift independently of each other and independently of the motor unit 14 thereby allowing a limited amount of independent movement. However, this movement is sufficient to allow the duct rodding mechanism 10 to negotiate bends or curves in the ducts 11 and also to pass over small obstacles therein.

After the duct rodding machine 10 has traversed a duct or conduit, a cable or conductor may be attached to the air hose 15 at either end of the duct and then drawn therethrough. If for any reason it is desired to withdraw the machine 10 before it has completely passed through a duct, the air pressure on the hose 15 is shut off and released thereby allowing both duct gripping units 12 and 13 to be contracted and permitting the machine 10 to be easily withdrawn by means of the air hose 15.

It will be apparent to those skilled in the art that certain changes and modifications may be made in the foregoing construction without departing from the spirit and scope of the invention. Accordingly, all matter described above or shown in the accompanying drawings is intended as illustrative and not in a limiting sense.

Having fully described the invention, what we claim as new is:

1. A duct rodding machine comprising, in combination, a normally contracted front duct gripping unit, a normally contracted rear duct gripping unit, and a fluid pressure operated motor unit operatively interconnected between said front and rear duct gripping unit, said motor unit being cyclically operable to distend said rear duct gripping unit into duct gripping engagement and advance said front duct gripping unit in its contracted condition and thereafter cyclically operable to distend said front duct gripping unit into duct gripping engagement and advance said rear duct gripping unit in its contracted condition.

2. A duct rodding machine comprising, in combination, a normally contracted front duct gripping unit, a normally contracted rear duct gripping unit, and a fluid pressure operated motor unit non-rigidly supported by and between said duct gripping units and operatively interconnected therewith, the non-rigid support connection between said motor unit and said duct gripping units permitting the latter to shift independently of each other and with respect to the longitudinal axis of said motor unit, and said motor unit being cyclically operable to distend said rear duct gripping unit into duct gripping engagement and advance said front duct gripping unit in its contracted condition and thereafter cyclically operable to distend said front duct gripping unit into duct gripping engagement and advance said rear duct gripping unit in its contracted condition.

3. A duct rodding machine comprising, in combination, a front duct gripping unit having a set of retractably mounted duct gripping members, spring means operatively connected with said gripping members so as normally to bias them in a contracted position, a fluid pressure operated power unit operatively interconnected with said duct gripping members so as to distend the same into duct gripping engagement, a rear duct gripping unit having a set of retractably mounted duct gripping members, spring means operatively connected with said second set of duct gripping members so as normally to bias them in a contracted position, a fluid pressure operated power unit operatively interconnected with said second set of duct gripping members so as to distend the same into duct gripping engagement, a master cylinder unit comprising a pressure cylinder disposed between said first and second fluid pressure operated power units and a double-acting piston in said cylinder, means interconnecting said pressure cylinder with one of said fluid pressure operated units for forward movement therewith, means interconnecting said double-acting piston with the other of said fluid pressure operated units for forward movement therewith, and a two-way pressure control valve operatively interconnected with said first and second fluid pressure operated units and with said master cylinder unit, said control valve in one position admitting fluid pressure to one of said fluid pressure operated units and to one side of said double-acting piston and in the second position admitting fluid pressure to the other of said fluid pressure operated units and to the opposite side of said double-acting piston, whereby in cyclic operation said rear duct gripping unit is distended into duct gripping engagement while said front duct gripping unit in contracted condition is advanced and thereafter said front duct gripping unit is distended into duct gripping engagement while said rear duct gripping unit in contracted condition is advanced.

4. A duct gripping unit for a duct rodding machine of the class described comprising, in combination, a hub member, a plurality of duct gripping shoes, and a pair of substantially parallel support links of substantially equal length for each of said shoes with each pair of said links being pivotally connected at their outer ends adjacent to the front and rear portions respectively of one of said shoes and being pivotally connected to said hub and operating rods pivotally connected to a link of each pair.

5. A fluid pressure operated motor unit for combination with a duct rodding machine having front and rear duct gripping units normally contracted, and distendible into duct gripping engagement, said motor unit comprising, in combination, an elongated pressure cylinder, a double acting piston in said cylinder, a hollow partitioned piston rod connected at one end to said piston and projecting at its opposite end from one end of said cylinder, a two-way control valve unit and a combination auxiliary piston and cylinder unit mounted on the outer end of said piston rod, a second combination auxiliary piston and cylinder unit mounted on the end of said pressure cylinder opposite that from which said piston rod projects, a fluid pressure transmitting conduit interconnecting the compression chamber of said second combination piston and cylinder unit with said pressure cylinder adjacent said end thereof from which said piston rod projects, and a snap-acting operating mechanism for turning said control valve having one operating element carried on the movable part of said valve and a cooperating operating element carried on said pressure cylinder and connected in lost-motion relationship with said first operating element, the auxiliary pistons of said combination piston and cylinder units being adapted to be operatively interconnected with the adjacent duct gripping units, and in cyclic operation said two-way control valve in one condition transmitting fluid pressure to one side of said double-acting piston and to the combination auxiliary piston and cylinder unit on the opposite side thereof until said double-acting piston is located in the opposite end of said pressure cylinder whereupon said valve operating mechanism turns said valve to its second condition wherein it transmits fluid pressure to the side of said double-acting piston opposite from that to which pressure was previously transmitted and to the other combination auxiliary piston and cylinder unit.

6. A duct rodding machine comprising, in combination, front and rear duct gripping units and a fluid pressure operated motor unit interconnected between said duct gripping units, each of said gripping units comprising, a hub member, a plurality of duct gripping shoes and a pair of support links for each of said shoes with each pair of said links being pivotally connected at their outer ends adjacent to the front and rear portions respectively of one of said shoes and being pivotally connected to said hub with one link in each of said pairs thereof being in the form of a bell crank with its pivotal connection to said hub being at the fulcrum thereof, said motor unit comprising an elongated pressure cylinder having one of the end walls thereof located inwardly of the adjacent end of the cylinder, a double-acting piston in said cylinder, a hollow partitioned piston rod secured at one end to said double-acting piston and projecting at its opposite end from said end of said pressure cylinder wherein said end wall is inwardly disposed, a two-way control valve unit and a combination auxiliary piston and cylinder unit mounted on said projecting end of said piston rod with said two-way control valve unit being disposed inwardly of said combination auxiliary piston and cylinder unit, a piston disposed in said end of said pressure cylinder wherein said end wall is inwardly disposed and a wall closing the outer end of this end of said pressure cylinder so as to form therein a second combination auxiliary piston and cylinder unit, a fluid pressure transmitting conduit interconnecting the compression chamber of said second combination auxiliary piston and cylinder unit with said pressure cylinder adjacent the opposite end thereof, and an overcenter operating mechanism for said control valve having one operating element carried on the movable part of said valve and a cooperating operating element carried on said pressure cylinder and interconnected in lost-motion relationship with said first valve operating element whereby said control valve is snap operated to one control condition when said double-acting piston is adjacent one end wall of said pressure cylinder and is snap operated to its other control condition when said double-acting piston is adjacent the opposite end wall of said pressure cylinder, connecting rods operatively interconnecting the auxiliary piston of each of said combination auxiliary piston and cylinder units with said bell crank links on the adjacent duct gripping unit whereby movement of said auxiliary pistons serves to distend the respective duct gripping units into duct gripping engagement, and a plurality of tie rods interconnecting the hub member of each of said duct gripping units with the cylinder of the adjacent one of said combination auxiliary piston and cylinder units with the opposite ends of said plurality of tie rods being fastened in ball and socket joints whereby each of said duct gripping units may move with respect to its longitudinal axis independently of said intermediate motor unit, and in cyclic operation said two-way control valve in one condition transmitting fluid pressure to one side of said double-acting piston and to the combination auxiliary piston and cylinder unit on the opposite side thereof until said double-acting piston is located in the opposite end of said pressure cylinder whereupon said valve operating mechanism turns said valve to its second condition wherein it transmits fluid pressure to the side of said double-acting piston opposite from that to which pressure was previously transmitted and to the other combination auxiliary piston and cylinder unit.

7. In a device of the class described, a pair of spaced apart duct gripping units, each unit comprising a head provided with a set of expansible duct gripping jaws carried thereupon, a reciprocating fluid pressure actuated motor disposed between said units, said motor comprising two relatively reciprocable motor parts and an automatic pressure fluid control valve for said parts, whereby each head moves with its connected motor part, and fluid pressure operated means for alternately actuating each set of duct gripping jaws, said latter means being controlled by said automatic valve.

8. The combination of claim 7, wherein said fluid pressure operated jaw actuating means comprise a pair of motor members each carried by the adjacent motor part, and operating rods flexibly connecting said motor members and said jaws.

9. A laterally flexible fluid pressure motor actuated duct rodding machine, comprising an automatic fluid pressure operated reciprocating motor having two main moving parts, an automatic control valve, and a pair of duct gripping units having automatically retractable and expansible jaws connected to said parts respectively, at least one of said units comprising a head, a plurality of links pivoted on the head and connected to the corresponding jaws, a radius rod flexibly connecting the head to the corresponding motor parts, a fluid pressure operated member carried by the said corresponding motor part, and controlled by said automatic valve, and a connecting rod flexibly connecting said member with said link.

10. In a device of the class described, the combination of a front duct gripping unit and a rear duct gripping unit both having movable gripping jaws, a main double acting reciprocating pressure actuated motor disposed between and connected to said units, comprising a double ended cylinder and a piston therein adapted to be reciprocated in said cylinder, an automatically actuated pressure fluid control valve for alternately admitting and exhausting pressure fluid from each end of the cylinder, a pair of auxiliary single acting pressure actuated motors each having a cylinder communicating at all times with the corresponding end of the main cylinder, and expansible jaws actuated by the auxiliary motors to activate the jaws at one end of the device when the main motor advances the other end of the device.

11. The combination of claim 10 with laterally flexible radius rod connections between the units and the corresponding main motor parts, the auxiliary motors being carried upon the corresponding main motor parts and laterally flexible connecting rods between the auxiliary motors and the gripping jaws of the unit.

12. In a device of the class described, a main reciprocating double acting fluid pressure actuated motor having an automatic valve, and comprising two parts automatically movable under fluid pressure alternately toward and away from each other under the control of said valve, a front duct gripping unit connected to one motor part, a rear duct gripping unit connected to the other motor part, each unit comprising a head and pivoted jaws, a radius rod flexibly connecting the head to the corresponding motor part, each of said motor parts carrying a jaw actuating fluid pressure operated motor, and there being a flexible operating connection from said jaw actuating fluid pressure operated motor to each of said pivoted jaws, said jaw actuating motors operating alternately with successive motions of the main motor parts whereby the device is progressively advanced by alternate forward movement of the main motor parts and connected duct gripping units.

CRONJE JASPER.
GEORGE T. HAWK.

REFERENCES CITED

The following references are of record in the file of this patent:

UNITED STATES PATENTS

| Number | Name | Date |
|---|---|---|
| 443,824 | Cope | Dec. 30, 1890 |
| 850,797 | Shaffer | Apr. 16, 1907 |
| 880,677 | Mars | Mar. 3, 1908 |
| 1,675,738 | Titcomb et al. | July 3, 1928 |